(12) United States Patent
    Klinzmann

(10) Patent No.: US 9,103,493 B2
(45) Date of Patent: Aug. 11, 2015

(54) COLLAPSIBLE STAND

(71) Applicant: Dale R. Klinzmann, Nunn, CO (US)

(72) Inventor: Dale R. Klinzmann, Nunn, CO (US)

( * ) Notice: Subject to any disclaimer, the term of this patent is extended or adjusted under 35 U.S.C. 154(b) by 0 days.

(21) Appl. No.: 14/250,109

(22) Filed: Apr. 10, 2014

(65) Prior Publication Data

US 2014/0306084 A1    Oct. 16, 2014

Related U.S. Application Data

(60) Provisional application No. 61/811,084, filed on Apr. 11, 2013.

(51) Int. Cl.
    A47B 91/00    (2006.01)
    F16M 11/04    (2006.01)

(52) U.S. Cl.
    CPC ......... F16M 11/046 (2013.01); *F16M 2200/08* (2013.01)

(58) Field of Classification Search
    CPC ................... F16M 11/046; F16M 2200/08
    USPC ............... 248/351, 352, 354.1, 354.2, 354.4, 248/354.5, 165, 43, 6; 52/126.3, 126.6, 52/632, 649.5, 127.2
    See application file for complete search history.

(56) References Cited

U.S. PATENT DOCUMENTS

| 705,653 | A | * | 7/1902 | Davis ........................ 248/188.8 |
| 1,832,801 | A | * | 11/1931 | Wright .......................... 248/165 |
| 3,307,280 | A | * | 3/1967 | Mazur .......................... 40/124.2 |
| 3,606,253 | A | * | 9/1971 | Wooten .......................... 254/88 |
| 4,014,517 | A | * | 3/1977 | Keagle ............................ 254/45 |
| 4,141,526 | A | | 2/1979 | John |
| 4,245,808 | A | | 1/1981 | John |
| D269,473 | S | | 6/1983 | Jonsson |
| 5,165,665 | A | | 11/1992 | Jolivette, Sr. |
| 5,901,935 | A | * | 5/1999 | Lai .............................. 248/354.1 |
| 5,915,672 | A | | 6/1999 | Dickey |
| 7,219,873 | B2 | * | 5/2007 | Harwood ...................... 248/519 |
| 7,690,613 | B2 | * | 4/2010 | Bowman et al. ......... 248/346.01 |
| 8,132,787 | B1 | | 3/2012 | Audet |
| 8,393,586 | B1 | * | 3/2013 | Mercure .................... 248/188.5 |

OTHER PUBLICATIONS

U.S. Appl. No. 61/811,084, filed Apr. 11, 2013.

* cited by examiner

*Primary Examiner* — Gwendolyn W Baxter
(74) *Attorney, Agent, or Firm* — Craig R. Miles; CR Miles P.C.

(57) ABSTRACT

A collapsible stand including plurality of side members, each having one or more fastener elements operable to removably engage one another to assemble a base capable of supporting a supportable object. The collapsible stand can further include a stabilizer, a support member guide, and a support member.

19 Claims, 9 Drawing Sheets

COLLAPSIBLE STAND

This United States Non-Provisional Patent Application claims the benefit of U.S. Provisional Patent Application No. 61/811,084, filed Apr. 11, 2013, hereby incorporated by reference herein.

I. FIELD OF THE INVENTION

Generally, collapsible stands and methods of making and using collapsible stands. Specifically, collapsible stands having a reduced-volume disassembled condition and a load-bearing assembled condition useful for engaging a supportable object.

II. BACKGROUND OF THE INVENTION

Conventional jack stands may be commonly used to support raised loads. For example, jack stands may frequently be employed to support motor vehicles.

Conventional jack stands may have variable configurations which may include a straight column, a pyramid or a cone. A disadvantage of straight column stands may be their relatively limited ground contact area and propensity to buckle under lateral load and, subsequently, relatively limited capacity to support a load as compared to pyramidal or conical configured stands. Thus, pyramidal or conical configured stands may offer greater ground contact area and have a greater buckling load as compared to straight column stands, therefore affording a greater load capacity than straight column stands. However, the components of conventional pyramidal or conical configured stands are typically joined in a fixed configuration by welds, rivets, or the like. Consequently, these conventional stands may have a fixed volume which may make transportation or storage inconvenient or more costly.

There remains a long-felt unresolved need for a stand having a load bearing assembled condition and a reduced volume disassembled condition.

III. SUMMARY OF THE INVENTION

Accordingly, a broad object of the invention can be to provide a collapsible stand having a reduced-volume disassembled condition and a load-bearing assembled condition useful for engaging a supportable object.

Another broad object of the invention can be a method of producing a collapsible stand having a reduced-volume disassembled condition which can be assembled to provide a load-bearing support useful for engaging a supportable object.

Another broad object of the invention can be a method of assembling a load-bearing support useful for engaging a supportable object from a collapsible stand having a reduced-volume disassembled condition.

Naturally, further objects of the invention are disclosed throughout other areas of the specification, drawings, and claims.

IV. BRIEF DESCRIPTION OF THE DRAWINGS

V. DETAILED DESCRIPTION OF THE INVENTION

Figure 1:
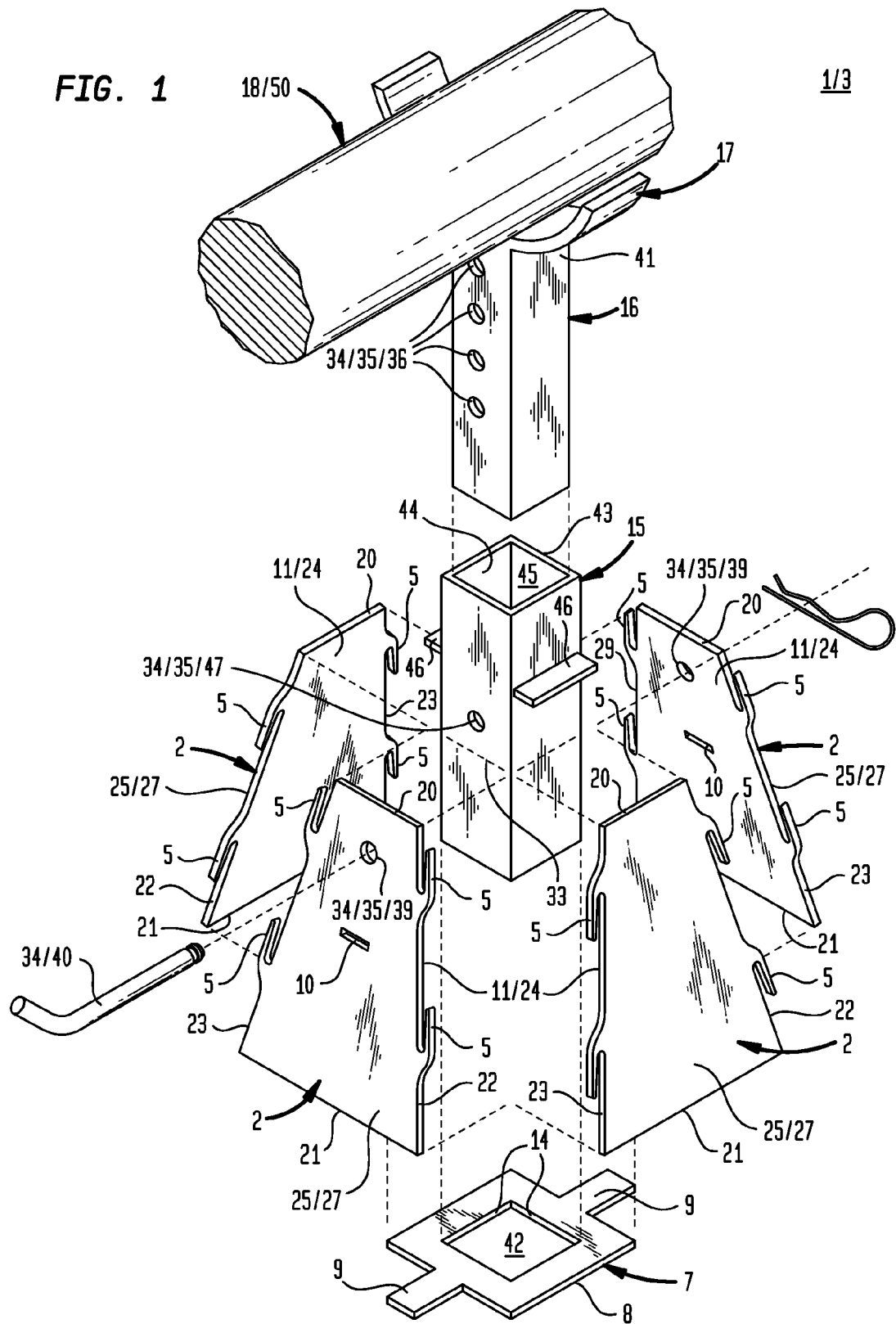
FIG. 1 is an exploded view of a particular embodiment of the inventive collapsible stand.
Figure 2:
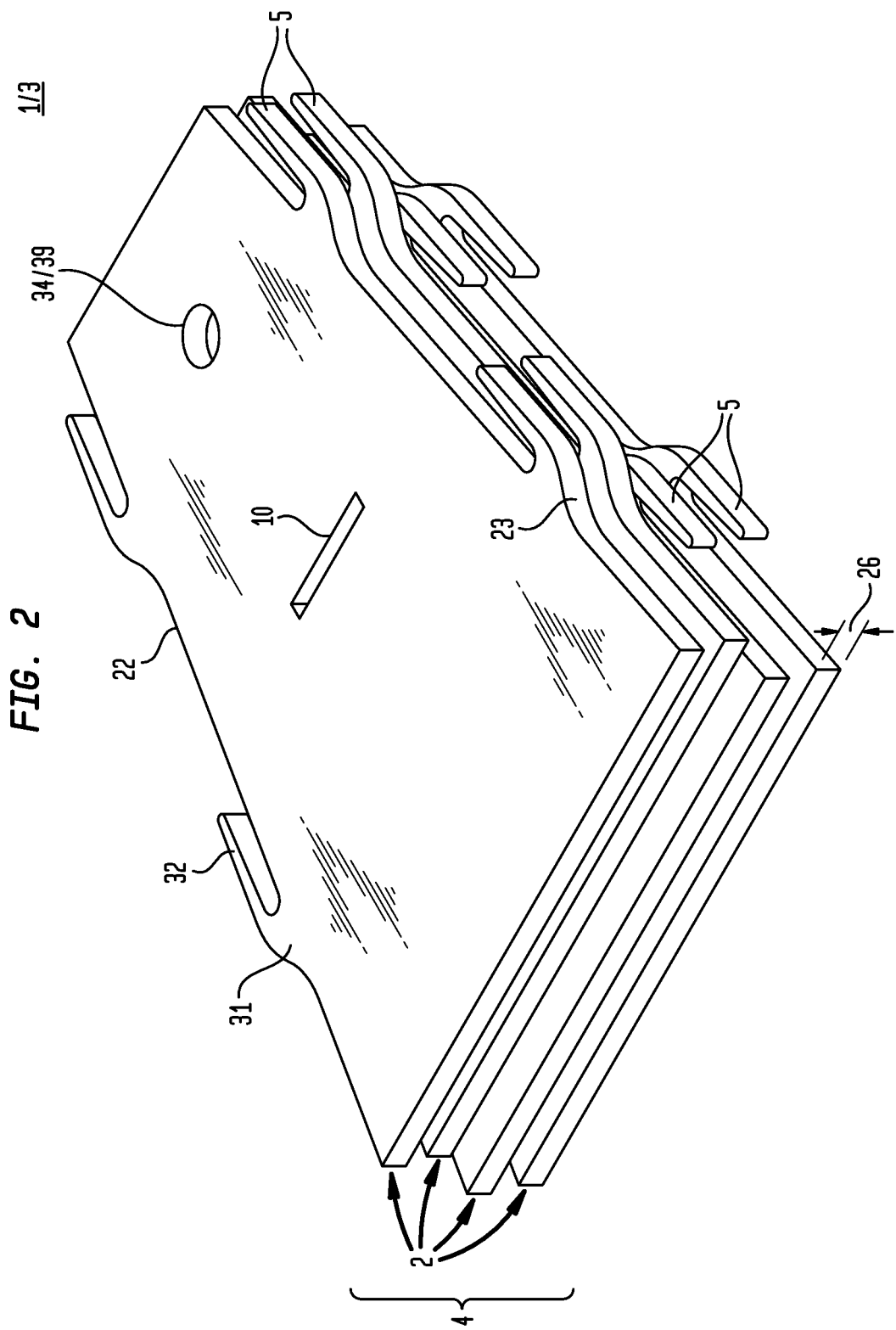
FIG. 2 is a perspective view of a plurality of side members of a particular embodiment of the inventive collapsible stand in a reduce-volume disassembled condition.
Figure 3:
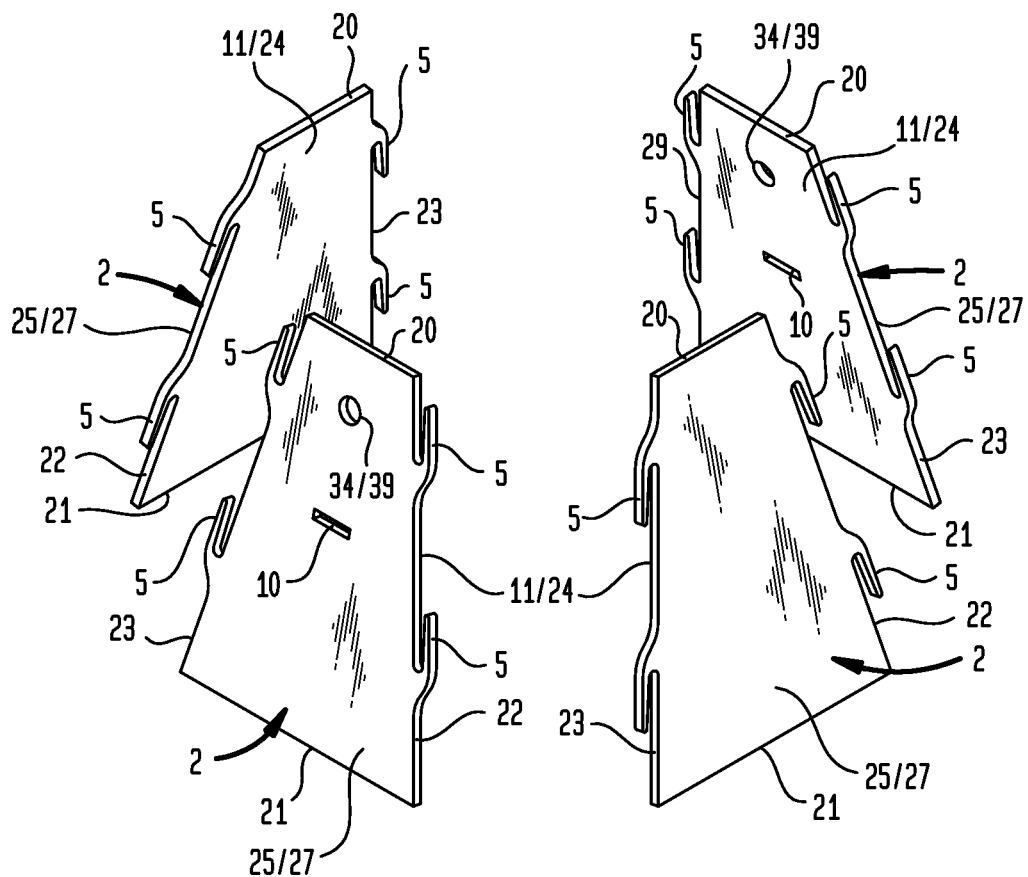
FIG. 3 is an exploded view of a plurality side members of the particular embodiment of the inventive collapsible stand shown in FIG. 1.
Figure 4:
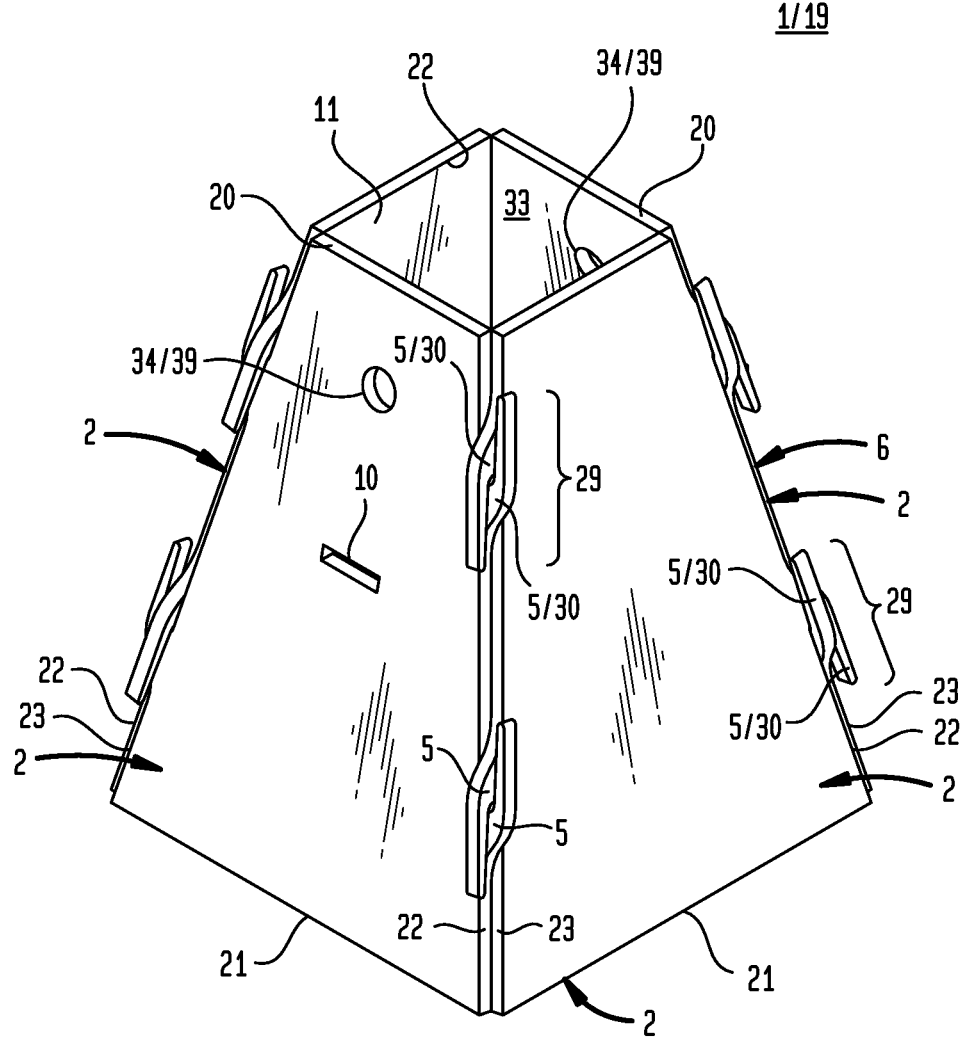
FIG. 4 is a perspective view of the plurality of side members of the particular embodiment of the inventive collapsible stand shown in FIG. 2 in an assembled load-bearing configuration.

Now referring primarily to FIG. 1 through FIG. 4, which illustrate a method of assembling a particular embodiment of the inventive collapsible stand (1). As to particular embodiments, a plurality of side members (2) can be obtained in a disassembled condition (3), which can be stacked in overlying engagement one upon another to form a substantially planate stack (4) (as shown in the example of FIG. 2). The planate stack (4) can occupy a reduced volume as compared to an assembled plurality of side members (2) (as shown in the example of FIG. 4). The plurality of side members (2) can each have one or more fastener elements (5) configured to removably engage to assemble a base (6) (as shown in the example of FIG. 4) from the disassembled plurality of side members (2) (as shown in the example of FIG. 2 and FIG. 3).

Now referring primarily to FIG. 1, particular embodiments of the inventive collapsible stand (1) can further include a stabilizer (7) bound by a stabilizer periphery (8) from which can extend one or more stabilizer tabs (9). The stabilizer (7) can be removably coupled to the base (6) during assembly of the plurality of side members (2) by inserting each stabilizer tab (9) into each corresponding one of side member aperture elements (10) to engage the stabilizer periphery (8) with a base internal surface (11) of the assembled base (6).

Figure 8:
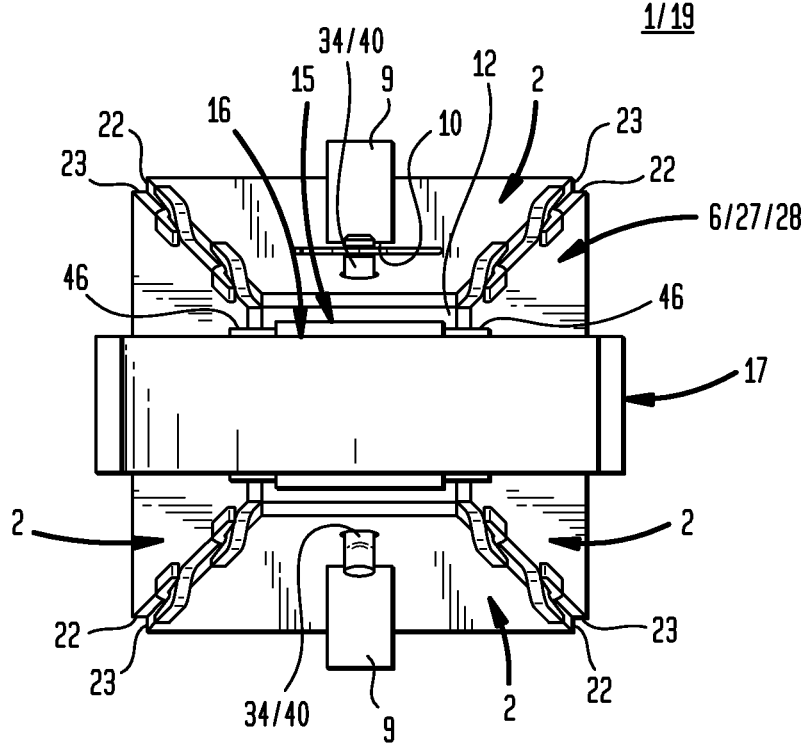
FIG. 8 is top view of a particular embodiment of the inventive collapsible stand.
Figure 9:
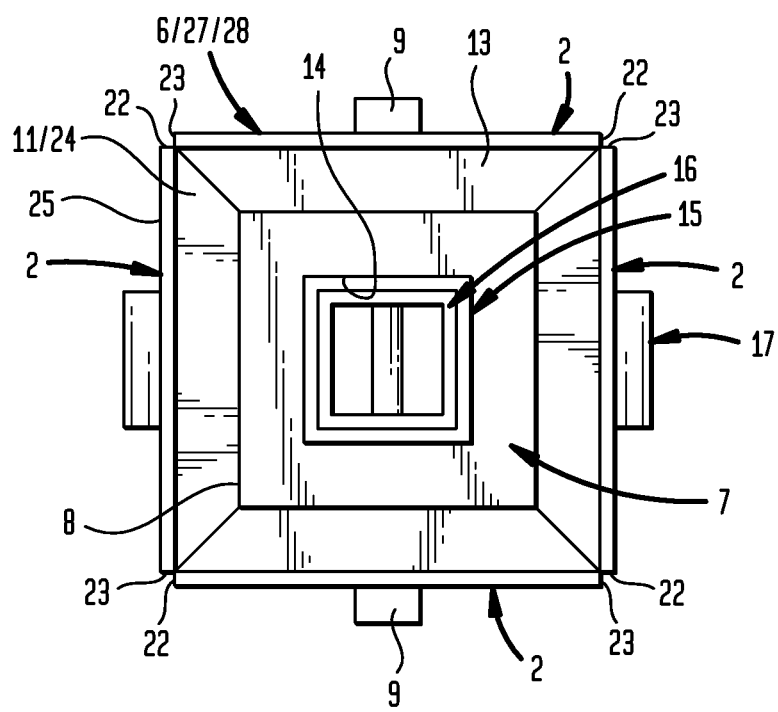
FIG. 9 is a bottom view of a particular embodiment of the inventive collapsible stand.

Now referring primarily to FIG. 8 and FIG. 9, the assembled base (6) can define a base top opening (12) and a base bottom opening (13), and the stabilizer (7) can further include a stabilizer opening (14). Upon assembly of the base (6), the stabilizer opening (14) can be aligned with the base top opening (12). As to particular embodiments, a support member guide (15) can be removably insertingly received into the base top opening (12) and the stabilizer opening (14). As to particular embodiments, a support member (16) can be telescopically engaged inside the support member guide (15). The support member (16) can terminate in a support terminal element (17), which can removably engage a supportable object (18) (as shown in the example of FIG. 1). The inventive collapsible stand (1) can be disassembled in a reverse order from the assembly of the inventive collapsible stand (1).

Now referring primarily to FIG. 4, which show an illustrative embodiment of the inventive collapsible stand (1) in an assembled condition (19). The side members (2) can be substantially planate and can have substantially similar dimensional relations. As to particular embodiments, each side member (2) can have a top edge (20), a bottom edge (21), and a pair of opposed side edges (22)(23), each one of the pair of opposed side edges (22)(23) configured to abuttingly engage to form a base (6) having a base internal surface (11) which encloses a tubular volume between the base top opening (12) (as shown in the example of FIG. 8) and the base bottom opening (13) (as shown in the example of FIG. 9).

Now referring primarily to FIG. 1 through FIG. 9, as to particular embodiments, the side members (2) can be substantially planate, including opposed flat side member faces (24) (25) disposed a thickness (26) apart (as shown in the example of FIG. 2). The pair of opposed side edges (22)(23) can have substantially equal length disposed between the top edge (20), which can be in substantially parallel relation to the bottom edge (21). As to particular embodiments, the top edge (20) and the bottom edge (21) can have unequal length, wherein the top edge (20) can have lesser length and the bottom edge (21) can have a greater length. The base (6) can be assembled by removably engaging the fastener elements (5) with one another to dispose each top edge (20) of lesser length at the base top opening (12) and each bottom edge (21) of greater length at the base bottom opening (13). As such, the side members (2) can be disposed in substantially angulated relation with one another. As to particular embodiments, the base (6) can be assembled from a plurality of substantially planate side members (2), the assembled base (6) having a trapezium configuration which can provide a base (6) having a base external surface (27) configured substantially in the form of a truncated pyramid (28).

While the illustrative examples shown in FIG. 1 through FIG. 9 depict a base (6) in an assembled condition (19) having a base external surface (27) substantially in the form of a truncated pyramid (28), other configurations of the inventive collapsible stand (1) can, upon assembly, provide a base (6) having a base external surface (27) in various other configurations, such as a truncated cone, a truncated oval, a truncated triangular pyramid, a truncated polygon, or the like, or combinations thereof.

Again referring to FIG. 1 through FIG. 9, as to particular embodiments, the inventive collapsible stand (1) can include fastener elements (5) configured to interdigitatingly couple by sliding engagement to form mated pairs of fastener elements (29) (as shown in the example of FIG. 4). As to particular embodiments, a mated pair of fastener elements (29) can include a mated pair of hook elements (30), one each extending in opposed relation from a corresponding pair of opposed side edges (22)(23) of equal length of a corresponding pair of side members (2) (as shown in the example of FIG. 4). As to particular embodiments, a hook element (30) can include a shank portion (31) connected to a hook portion (32) (as shown in the example of FIG. 2). The shank portion (31) can be coupled to a side member (2) in numerous and varied locations along the side edges (22)(23). As to particular embodiments, the hook portion (32) can be disposed in angled relation to the shank portion (31). As shown in the example of FIG. 2, the hook portion (32) can be disposed in an angled relation of about 90 degrees to the shank portion (32); as such, the hook portion (32) can be disposed in substantially parallel relation to the side edge (22)(23) to which the shank portion (31) can be coupled to in substantially perpendicular relation.

As to particular embodiments, the side members (2) can be produced from at least one, one or more, or a combination of a wide variety of materials including as illustrative examples: metal sheet such as hot rolled steel, cold rolled steel, mild steel, aluminum, perforated sheet metal, and the like; plastic sheet such as polycarbonate, polyetheretherketone, polyben- zimidazole, polyamide-imide, and the like; composite materials such as phenolic laminate, fiber reinforced polymers, ceramic matrices, metal matrices, graphite composite, and the like. Additionally, side members (2) can be produced from any material and any process (such as molding or machining) which results in the side members (2) having sufficient rigidity and strength to allow assembly into a particular embodiment of the inventive collapsible stand (1). Depending upon the supportable object (18), the material selected will have a greater or lesser rigidity and strength. As to particular embodiments, side members (2) can be produced from metal sheet having a thickness of between about $1/16$ inch to about $1/2$ inch. As to particular embodiments, the thickness of the metal sheet can be selected from the group including or consisting of: between about $1/16$ inch to about $3/16$ inch, between about $1/8$ inch to about $1/4$ inch, between about $3/16$ inch to about $5/16$ inch, between about $1/4$ inch to about $3/8$ inch, between about $5/16$ inch to about $7/16$ inch, and between about $3/8$ inch to about $1/2$ inch.

Again referring primarily to FIG. 5 through FIG. 9, particular embodiments of the inventive collapsible stand (1) can further include support member (16), which can be produced from a solid or tubular rod having a generally square cross section. The support member (16) can be insertingly received by a corresponding base top opening (12) which can bound a generally square base top opening area (33) of sufficient dimension to insertingly receive the support member (16). Additional cross sectional configurations of the support member (16) encompassed by the inventive collapsible stand (1) can include, as illustrative examples: circular, oval, elliptical, triangular, rectangular, polygonal, or the like, or combinations thereof.

According to particular embodiments, the support member (16) can be disposed in removably fixed relation to the base (6). According to other particular embodiments, the support member (16) can be disposed in variably adjustable relation to the base (6). According to yet other particular embodiments, the support member (16) can be removably secured within the base (6).

Figure 5:
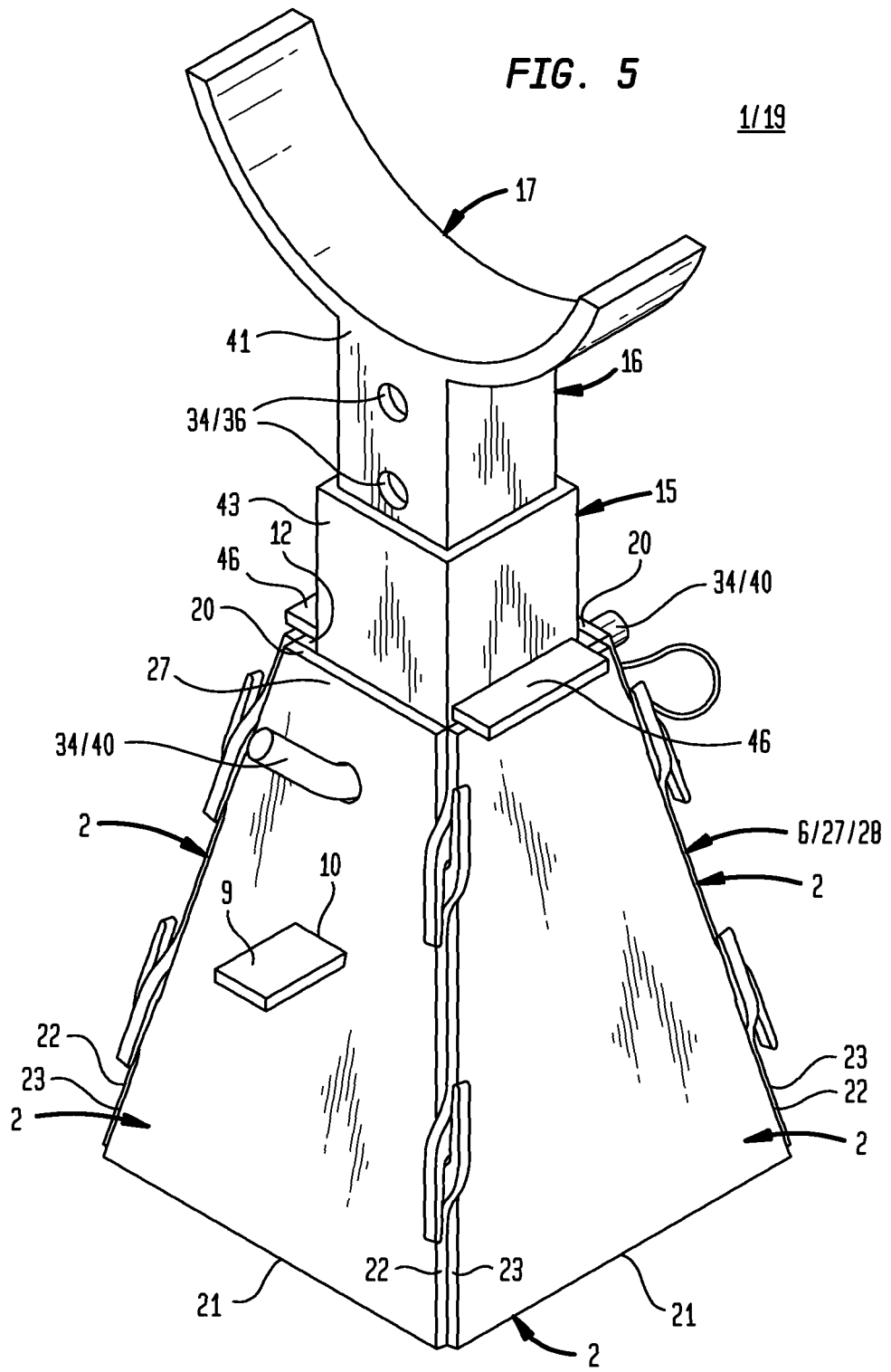
FIG. 5 is a perspective view of a particular embodiment of the inventive collapsible stand.
Figure 6:
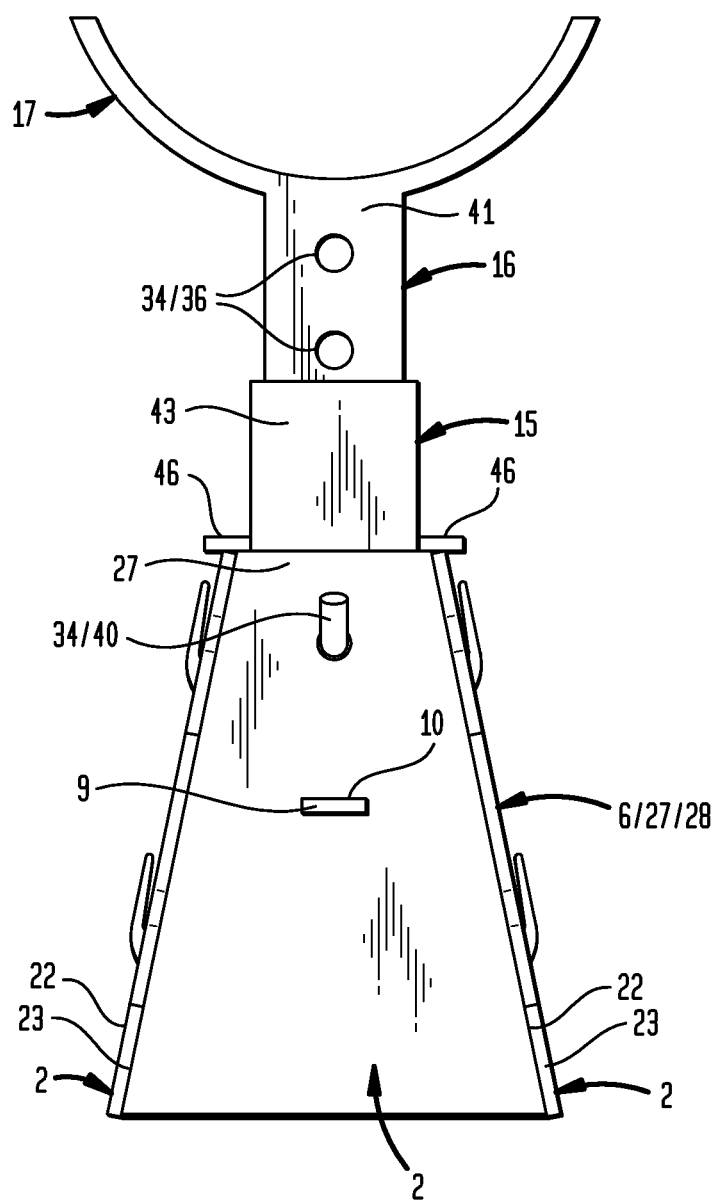
FIG. 6 is front view of a particular embodiment of the inventive collapsible stand.
Figure 7:
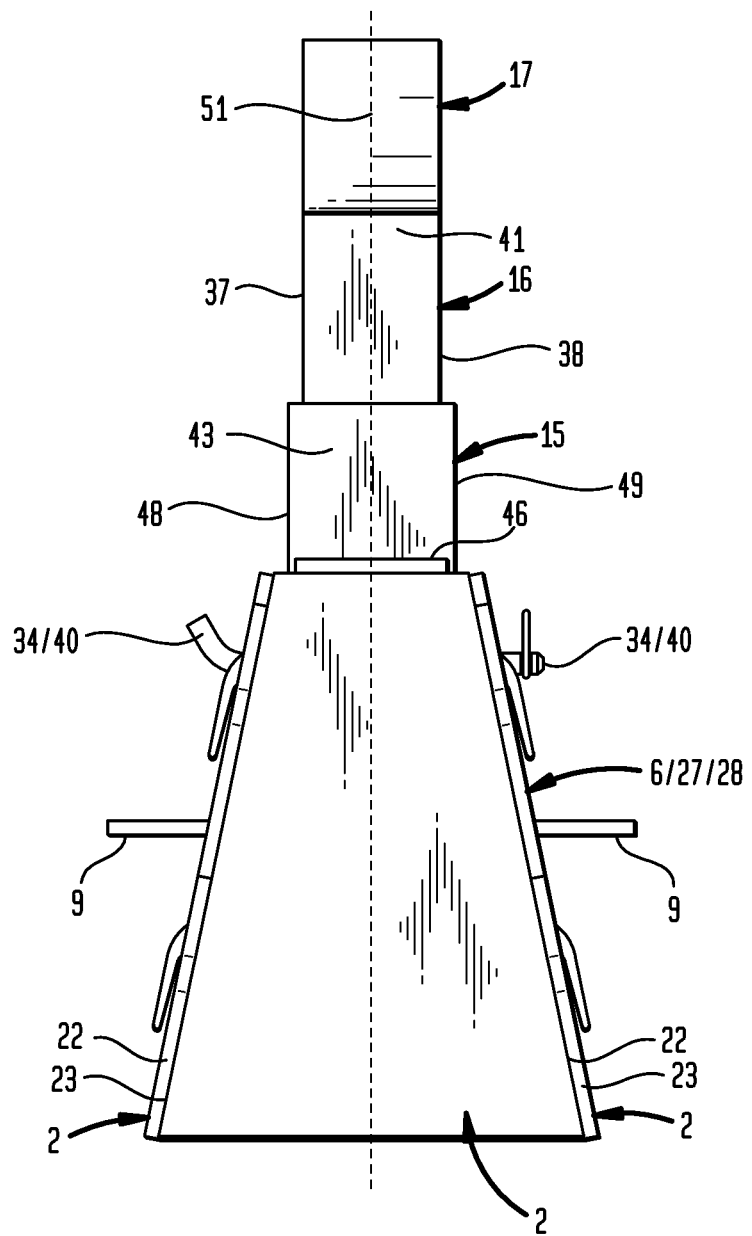
FIG. 7 is a side view of a particular embodiment of the inventive collapsible stand.

Now referring primarily to FIG. 5 through FIG. 9, the support member (16) can further include a support member height adjustment element (34). As to particular embodiments, the support member height adjustment element (34) can include a pass-through (35) formed by aligning a support member bore element (36), which communicates between opposed support member sides (37)(38) (as shown in the example of FIG. 7), and a side member bore element (39), which communicates between the base internal surface (11) and the base external surface (27). A securing element (40) can be configured to removably insert into the pass-through (35), whereby insertion of the securing element (40) through the pass-through (35) secures the support member (16) in a fixed location within the base (6). As to particular embodiments, at least one side member bore element (39) can be disposed within each of a pair of opposed side members (2) of the base (6).

Now referring primarily to FIG. 5 through FIG. 7, the support member (16) can further include a support terminal element (17) coupled to a support member first end (41). As to particular embodiments, the support terminal element (17) can be configured to engage a supportable object (18) (as shown in the example of FIG. 1). As to particular embodiments, the support terminal element (17) can have an arcuate form; however, the invention is not so limited and the support terminal element (17) can be configured in any manner which allows engagement with a supportable object (18).

Again referring primarily to FIG. 1 and FIG. 9, particular embodiments of the inventive collapsible stand (1) can further include a stabilizer (7) having a stabilizer periphery (8) and a stabilizer opening (14), which bounds a stabilizer opening area (42). The stabilizer periphery (8) can be configured to engage the base internal surface (11) when a plurality of side members (2) are assembled into a base (6). As shown in the example of FIG. 9, the entire length or substantially the entire length of the stabilizer periphery (8) can engage or contact the base internal surface (11). The base top opening (12) and the stabilizer opening (14) can insertingly receive the support member (16) upon alignment of the base top opening (12) and the stabilizer opening (14). As shown in FIG. 9, the entire length or substantially the entire length of the boundary of the stabilizer opening (14) can engage or contact the support member guide (15).

As to particular embodiments, the stabilizer opening (14) can bound a substantially square stabilizer opening area (42). The substantially square stabilizer opening (42) can be aligned with a substantially square base top opening area (33) to insertingly receive a support member (16) having a generally square configuration. Additional configurations of the stabilizer opening (14) encompassed by the instant invention include, as illustrative examples: circular, oval, elliptical, triangular, rectangular, polygonal, or the like, or combinations thereof.

Now referring primarily to FIG. 5 through FIG. 9, the stabilizer (7) can include one or more stabilizer tabs (9) extending from the stabilizer periphery (8). Additionally, side members (2) of the base (6) can include one or more side member aperture elements (10) communicating between opposed flat side member faces (24)(25). Corresponding stabilizer tabs (9) and side member aperture elements (10) can be located to allow one or more stabilizer tabs (9) to be inserted into one or more corresponding side member aperture elements (10) to locate the stabilizer periphery (8) proximate to, engaging with, or in contact with the base internal surface (11).

Again referring primarily to FIG. 5 through FIG. 9, particular embodiments of the inventive collapsible stand (1) can further include a support member guide (15), which can be removably inserted into the base top opening (12). As to those particular embodiments including a stabilizer (7), the support member guide (15) can be removably inserted into the base top opening (12) and the stabilizer opening (14) upon alignment of the base opening (12) and the stabilizer opening (14).

As to particular embodiments, the support member guide (15) can be produced from a substantially square tube having a substantially square support member guide external surface (43) and a substantially square support member guide internal surface (44) defining a support member guide passage (45) (as shown in the example of FIG. 1). The base top opening (12) can correspondingly bound a substantially square base top opening area (33) and, as to those particular embodiments which include a stabilizer (7), the stabilizer opening (14) can bound a substantially square stabilizer opening area (42). Alignment of the substantially square stabilizer opening (14) with the substantially square base top opening (12) of a base (6) in an assembled condition (19) allows the support member guide (15) to be removably inserted into the base top opening area (33) and into the stabilizer opening area (42). Additional configurations of the support member guide (15) encompassed by the instant invention include, as illustrative examples: circular, oval, elliptical, triangular, rectangular, polygonal, or the like, or combinations thereof.

Now referring primarily to FIG. 5 through FIG. 8, a support member guide (15) can further include one or more stop elements (46) extending from a support member guide external surface (43). The one or more stop elements (46) can engage with a top edge (20) of one or more side members (2) of a base (6) in an assembled condition (19). The one or more stop elements (46) engaged with one or more top edges (20) of one or more side members (2) of a base (6) in an assembled condition (19) can interrupt travel and establish the support member guide (15) in removable fixed relation to the base (6).

Now referring primarily to FIG. 1 and FIG. 7, a support member guide (15) can further include a pair of support member guide bore elements (47) (as shown in the example of FIG. 1), which communicate between opposed support member guide sides (48)(49) (as shown in the example of FIG. 7). The pair of support member guide bores elements (47) can be aligned with the support member bore elements (36) as part of the pass-through (35) of the support member height adjustment element (34) to allow variable height adjustment of the support member (16) in relation to the base (6). The securing element (40) can be configured to removably insert into the pass-through (35), thereby removably securing the support member (16) and the support member guide (15) within the base (6).

As to particular embodiments, the inventive collapsible stand (1) in the assembled condition (19) can support a load (50) in the range of between about 5,000 pounds to about 25,000 pounds. As to particular embodiments, the load (50) can be selected from the group including or consisting of: between about 5,000 pounds to about 10,000 pounds, between about 7,500 pounds to about 12,500 pounds, between about 10,000 pounds to about 15,000 pounds, between about 12,500 pounds to about 17,500 pounds, between about 15,000 pounds to about 20,000 pounds, between about 17,500 pounds to about 22,500 pounds, and between about 20,000 pounds to about 25,000 pounds. However, the invention is not so limited and embodiments of the inventive collapsible stand (1) in the assembled condition (19) can support a load (50) of less than about 5,000 pounds or greater than about 25,000 pounds.

As to particular embodiments, the inventive collapsible stand (1) can be provided as a kit comprising a plurality of side members (2), each having a top edge (20), a bottom edge (21), and a pair of opposed side edges (22)(23), each one of the pair of opposed side edges (2)(23) configured to abuttingly engage to assemble a base (6) having a base internal surface (11), which can enclose a tubular volume between a base top opening (12) and a base bottom opening (13); and a fastener element (5) extending from each of the pair of opposed side edges (22)(23) of the plurality of side members (2), each fastener element of a first of the plurality of side members (2) located to removably fasten with the fastener element of a second of the plurality of side members (2) on abutting engagement of each one of the pair of opposed side edges (22)(23) to fix assembled configuration of the base (6).

As to particular embodiments, the inventive collapsible stand (1) can be provided as a kit wherein each of the plurality of side members (2) further includes opposed flat side member faces (24)(25) disposed a thickness (26) apart, the plurality of side members (2) capable of overlaying engagement to provide a planate stack (4).

As to particular embodiments, the inventive collapsible stand (1) can be provided as a kit wherein each of the plurality of side members (2) further includes a pair of opposed side edges (22)(23) having substantially equal length disposed between the top edge (20) disposed in substantially parallel relation to the bottom edge (21), the top edge (20) and the bottom edge (21) having unequal length, the top edge (20) having a lesser length and the bottom edge (21) having a greater length, the fastener elements (5) fasten to dispose each top edge (20) of lesser length at the base top opening (12) and each bottom edge (21) of greater length at the base bottom opening (13).

As to particular embodiments, the inventive collapsible stand (1) can be provided as a kit further including a support member (16), wherein the plurality of side members (2) and the support member (16) can removably engage to assemble an embodiment of the inventive collapsible stand (1).

As to particular embodiments, the inventive collapsible stand (1) can be provided as a kit further including a stabilizer (7), wherein the plurality of side members (2), the support member (16), and the stabilizer (17) can removably engage to assemble an embodiment of the inventive collapsible stand (1).

As to particular embodiments, the inventive collapsible stand (1) can be provided as a kit further including a support member guide (15), wherein the plurality of side members (2), the support member (16), and the support member guide (15) can removably engage to assemble an embodiment of the inventive collapsible stand (1).

As to particular embodiments, the inventive collapsible stand (1) can be provided as a kit further including a stabilizer (7), wherein the plurality of side members (2), the support member (16), the support member guide (15), and the stabilizer (17) can removably engage to assemble an embodiment of the inventive collapsible stand (1).

Example 1

Axial tension and compression tests were conducted to assess load deformation, wherein the test was repeated three times with three substantially identical inventive collapsible stands (1) under serial incremental increases in load (50). Each of the inventive collapsible stands (1) were assembled as above described and mounted to a load frame having a static load frame first end and a mobile load frame second end. The load frame operated to apply a serial incremental increase in load (50) to each of the inventive collapsible stands (1) in a direction coaxial with the support member longitudinal axis (51) (as shown in the example of FIG. 7). Load (50) was applied to each of the inventive collapsible stands (1) in serial increments of approximately 1,000 pounds, with each load (50) increment held for a minimum of approximately one minute. The amount of deformation was recorded after each incremental increase of approximately 1,000 pounds. The axial tension and compression test was stopped at approximately 20,000 pounds.

Figure 10:
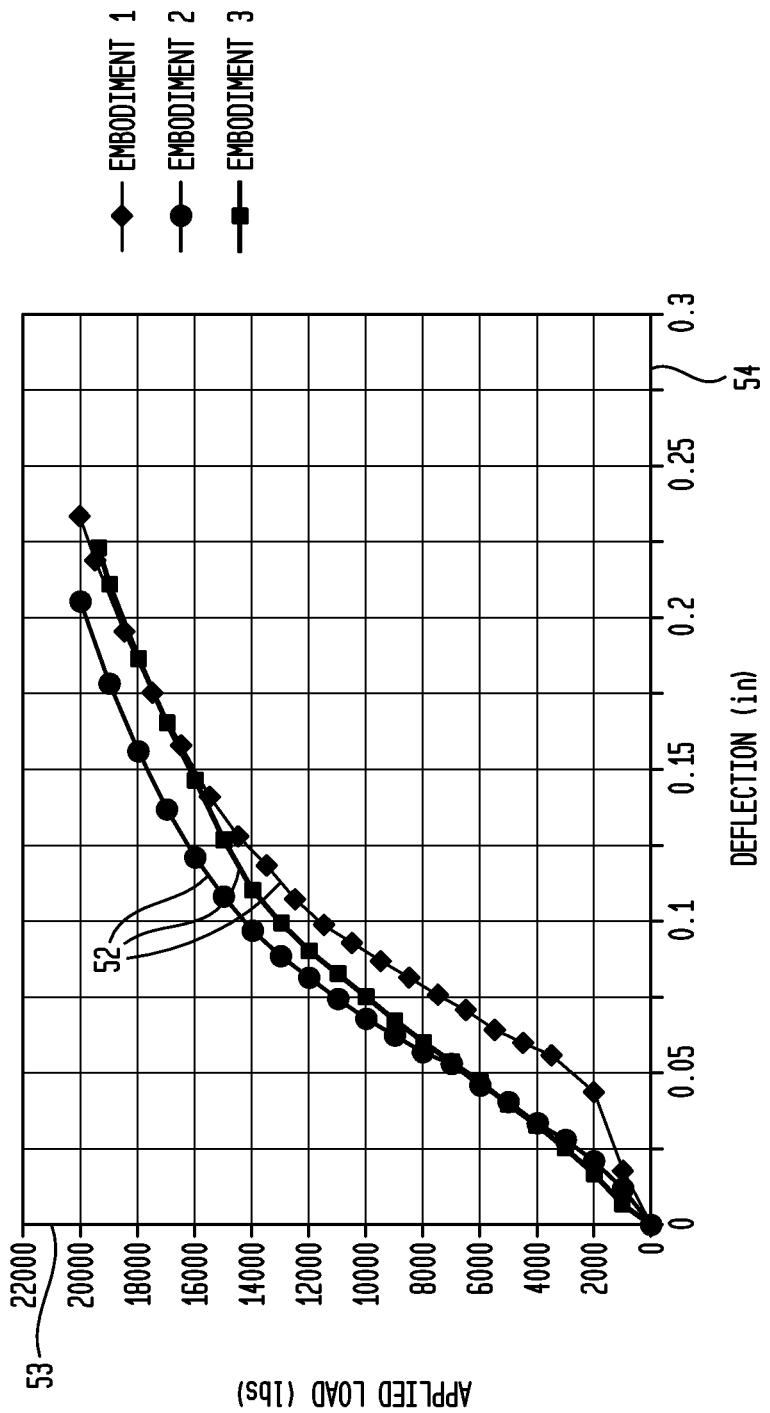
FIG. 10 is a graph which plots deflection of the inventive stand in the assembled load-bearing condition in response to an applied load during axial tension and compression testing.

Now referring primarily to FIG. 10, a graph including load deformation curves (52) generated from axial tension and compression tests repeated three times with three substantially identical inventive collapsible stands (1). The load (50) in pounds applied to each of the inventive collapsible stands (1) during the axial tension and compression tests was plotted on the vertical axis (53) and deflection in inches of each of the inventive collapsible stand (1) was plotted on the horizontal axis (54). The corresponding deflections resulting from each incremental application of approximately 1,000 pounds between about 1,000 pounds to about 20,000 pounds for each of the three inventive collapsible stands (1) were recorded on the graph as solid symbols, including circles, squares and diamonds. For the three inventive collapsible stands (1) tested, the deflection was less than approximately ¼ inch at the maximum tested load (50) of approximately 20,000 pounds. As a result, the axial tension and compression tests concluded that no failure to support the applied loads (50) was detected in any of the three inventive collapsible stands (1) tested.

As can be easily understood from the foregoing, the basic concepts of the present invention may be embodied in a variety of ways. The invention involves numerous and varied embodiments of a collapsible stand and methods for making and using such collapsible stands including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "support" should be understood to encompass disclosure of the act of "supporting"—whether explicitly discussed or not—and, conversely, were there effectively disclosure of the act of "supporting", such a disclosure should be understood to encompass disclosure of a "support" and even a "means for supporting." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the collapsible stands herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A collapsible stand, comprising:
   a plurality of side members, each having a top edge, a bottom edge, and a pair of opposed side edges, each one of said pair of opposed side edges configured to abuttingly engage to form a base having a base internal surface which encloses a tubular volume between a base top opening and a base bottom opening; and
   a fastener element extending from each of said pair of opposed side edges of said plurality of side members, each said fastener element of a first of said plurality of side members located to removably fasten with said fastener element of a second of said plurality of side members on abutting engagement of each one of said pair of opposed side edges to fix configuration of said base; and a support member configured to removably insert into said base top opening of said base.

2. The collapsible stand of claim 1, wherein each of said plurality of side members further includes opposed flat side member faces disposed a thickness apart, said pair of opposed side edges having substantially equal length disposed between said top edge disposed in substantially parallel relation to said bottom edge, said top edge and said bottom edge having unequal length, said top edge having a lesser length and said bottom edge having a greater length, said fastener elements fasten to dispose each said top edge of said lesser length at said base top opening and each said bottom edge of said greater length at said base bottom opening.

3. The collapsible stand of claim 2, wherein said base further comprises an external surface having a configuration substantially in a form of a truncated pyramid.

4. The collapsible stand of claim 2, wherein said fastener elements interdigitatingly couple by sliding engagement to form mated pairs of said fastener elements.

5. The collapsible stand of claim 1, further comprising a support member height adjustment element configured to dispose said support member in fixed height relation to said base.

6. The collapsible stand of claim 5, wherein said support member height adjustment element includes:
   a support member bore element which communicates between opposed support member sides;
   a side member bore element which communicates between said base internal surface and a base external surface, said support member bore element alignable with said side member bore element to provide a pass-through; and
   a securing element configured to removably insert into said pass-through.

7. The collapsible stand of claim 6, further comprising a support terminal element coupled to a support member first end, said support terminal element configured to removably engage with a supportable object.

8. The collapsible stand of claim 1, further comprising:
   a stabilizer having a stabilizer periphery and a stabilizer opening which bounds a stabilizer open area, said stabilizer periphery removably coupled to said base internal surface of said base to align said stabilizer opening with said base top opening, said stabilizer open area configured to insertingly receive said support member.

9. The collapsible stand of claim 8, further comprising:
   a stabilizer tab extending from said stabilizer periphery; and
   a side member aperture element which communicates between said opposed flat side member faces of one of said plurality of side members, said stabilizer tab insertingly receivable by said side member aperture element.

10. The collapsible stand of claim 1, further comprising:
    a support member guide removably inserted into said base top opening, said support member telescopically engaged inside of said support member guide.

11. The collapsible stand of claim 10, further comprising a stop element extending from a support member guide external surface, said stop element configured to removably engage said top edge of said side member.

12. The collapsible stand of claim 10, further comprising a support member height adjustment element configured to dispose said support member in fixed height relation to said base.

13. The collapsible stand of claim 12, wherein said support member height adjustment element includes:
   a support member bore element which communicates between opposed support member sides;
   a support member guide bore element which communicates between opposed support member guide sides;
   a side member bore element which communicates between said base internal surface and a base external surface, said support member bore element and said support member guide bore element alignable with said side member bore element to provide a pass-through; and
   a securing element configured to removably insert into said pass-through.

14. The collapsible stand of claim 13, further comprising:
   a stabilizer having a stabilizer periphery and a stabilizer opening which bounds a stabilizer open area, said stabilizer periphery removably coupled to said base internal surface of said base to align said stabilizer opening with said base top opening, said stabilizer open area configured to insertingly receive said support member.

15. The collapsible stand of claim 14, further comprising:
   a stabilizer tab extending from said stabilizer periphery; and
   a side member aperture element which communicates between said opposed flat side member faces of one of said plurality of side members, said stabilizer tab insertingly receivable by said side member aperture element.

16. The collapsible stand of claim 15, wherein said collapsible stand has a deflection of less than one quarter inch under a load applied to a longitudinal axis of said support member in a range of between about 1,000 pounds to about 25,000 pounds.

17. The collapsible stand of claim 16, wherein said load is selected from group consisting of: between about 5,000 pounds to about 10,000 pounds, between about 7,500 pounds to about 12,500 pounds, between about 10,000 pounds to about 15,000 pounds, between about 12,500 pounds to about 17,500 pounds, between about 15,000 pounds to about 20,000 pounds, between about 17,500 pounds to about 22,500 pounds, and between about 20,000 pounds to about 25,000 pounds.

18. A kit, comprising:
   a plurality of side members, each having a top edge, a bottom edge, and a pair of opposed side edges, each one of said pair of opposed side edges configured to abuttingly engage to assemble a base having a base internal surface which encloses a tubular volume between a base top opening and a base bottom opening;
   a fastener element extending from each of said pair of opposed side edges of said plurality of side members, each said fastener element of a first of said plurality of side members located to removably fasten with said fastener element of a second of said plurality of side members on abutting engagement of each one of said pair of opposed side edges to fix assembled configuration of said base; and a support member configured to removably insert into said base top opening of said base.

19. The kit of claim 18, wherein each of said plurality of side members further includes opposed flat side member faces disposed a thickness apart, said plurality of side members capable of overlaying engagement to provide a planate stack.

* * * * *